United States Patent [19]

VerMehren

[11] 4,160,500
[45] Jul. 10, 1979

[54] TURN CONVEYOR

[75] Inventor: Hubert R. VerMehren, Florissant, Mo.

[73] Assignee: Ga-Vehren Engineering Company, St. Louis, Mo.

[21] Appl. No.: 832,401

[22] Filed: Sep. 12, 1977

[51] Int. Cl.² .......................................... B65G 47/30
[52] U.S. Cl. .................................. 198/457; 198/620; 198/831; 271/225
[58] Field of Search .............. 271/225, 184; 198/831, 198/457, 412, 620, 721, 725

[56] References Cited

U.S. PATENT DOCUMENTS

| 2,157,283 | 5/1939 | Dyson | 198/831 |
|---|---|---|---|
| 2,729,324 | 1/1956 | Howdle | 198/457 X |
| 3,080,956 | 3/1963 | Saltzmann | 271/184 X |
| 3,651,924 | 3/1972 | Homeier et al. | 198/831 X |

*Primary Examiner*—Bruce H. Stoner, Jr.

*Attorney, Agent, or Firm*—Cohn, Powell & Hind

[57] ABSTRACT

This turn conveyor apparatus is disposed between two conveyors having angularly related travel axes for the purpose of transporting articles, such as envelopes, from one conveyor to the other. The turn conveyor includes drive and idler sprockets having horizontal, angularly related axes of rotation, said sprockets being connected by an endless belt traversing a rotating corner disc assembly having a vertical axis of rotation and being disposed between the sprockets. The disc assembly includes upper and lower discs receiving the endless belt and said endless belt includes spaced friction pads on the outer surface. The disc assembly also includes a base disc located below the lower disc and having an annular surface disposed adjacent the endless belt and cooperating with the friction pads to grip the envelopes and transport them in an arcuate path from one angularly related conveyor to the other.

15 Claims, 6 Drawing Figures

TURN CONVEYOR

BACKGROUND OF THE INVENTION

This invention relates generally to conveyors for transporting articles in an arcuate path and more particularly to a transition conveyor for transporting flat articles between two angularly related conveyors.

The prior art discloses several examples of conveyors which have transition sections for the purpose of transporting conveyed articles between two other angularly related conveyor sections. For example, U.S. Pat. Nos. 2,014,447 and 2,016,268 disclose systems which convey sheet articles between two horizontally related paths connected by a vertical belt system. However, these systems are not adaptable for use in conveying sheet articles through an arcuate path in the horizontal plane. Link belt systems are also known which are capable of transporting articles through a right angle turn by the use of corner disc assemblies. However, such systems, which are known commercially as Multiflex conveyors, are not intended to convey sheet articles. The present turn conveyor provides an improvement on the above and similar systems which is neither disclosed nor suggested in the known prior art.

SUMMARY OF THE INVENTION

This turn conveyor provides a means of transporting flat articles between angularly related conveyors through an arcuate path in the plane of the article.

The turn conveyor includes a support means; first and second rotatable elements mounted to the support means; an endless flexible element disposed about said rotatable elements and having friction means disposed on the outer face thereof and a corner disc assembly disposed between said rotatable elements and cooperating with the friction means to carry the articles through an arcuate path between the angularly related conveyors.

The disc assembly includes a shaft mounting upper and lower guide discs receiving the upper and lower spans of the flexible element in guided rotation, and a coaxially disposed base disc disposed below the lower guide disc and having an annular surface cooperating with the flexible element friction means to carry the flat articles in said arcuate path.

The friction means on the endless flexible element are provided by resilient pads attached to the outer surface of said element.

The support means for the disc assembly include upper and lower rails and a carriage mounted to the rails in adjustable relation and said disc assembly is mounted to upper and lower portions of the carriage for movement therewith.

The base disc is mounted to the disc assembly shaft in longitudinally adjustable relation to selectively space said disc from the surface of the flexible element depending on the thickness of the flat article to be transported between said flexible element and said base disc.

The endless flexible element includes a plurality of universally connected links, selected links having individual resilient pads attached to the outer surface thereof.

The support means includes a shaft disposed in parallel relation to the rails and carrying one of said rotatable elements in movable relation, the other of said rotatable elements being mounted on a shaft carried by the carriage.

The support means includes table guides disposed in circumferentially adjacent relation to the base disc to support the outer portions of the flat articles during arcuate motion thereof, said table guides being adjustably mounted to the lower rail.

A roller arm means is mounted to the support means to apply pressure to the flat article prior to delivery thereof between the link belt and the base disc.

This turn conveyor is relatively inexpensive to manufacture and is simple and effective in operation.

DESCRIPTION OF THE PREFERRED EMBODIMENT

Figure 1:
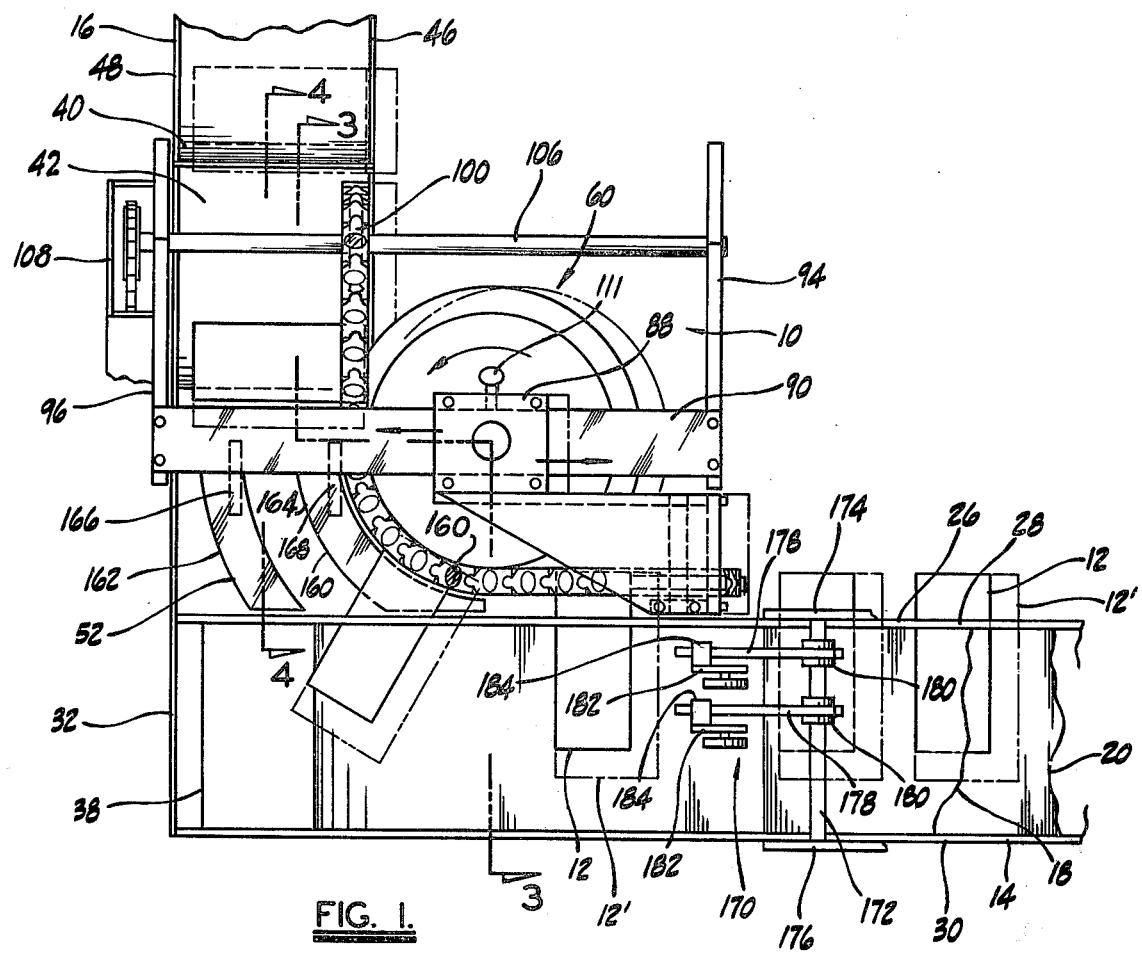
FIG. 1 is a plan view of the turn conveyor apparatus.

Referring now by reference numerals to the drawings and first to FIG. 1, it will be understood that the turn conveyor, which is generally indicated by numeral 10, is used to transport envelopes or the like such as indicated by numeral 12 from a first, supply conveyor indicated by numeral 14 to a second, follower conveyor indicated generally by numeral 16 which is angularly related to said first conveyor through an arcuate path between the conveyors. For exemplary purposes the first and second conveyors are shown in the drawing as being perpendicular to each other.

Figure 2:
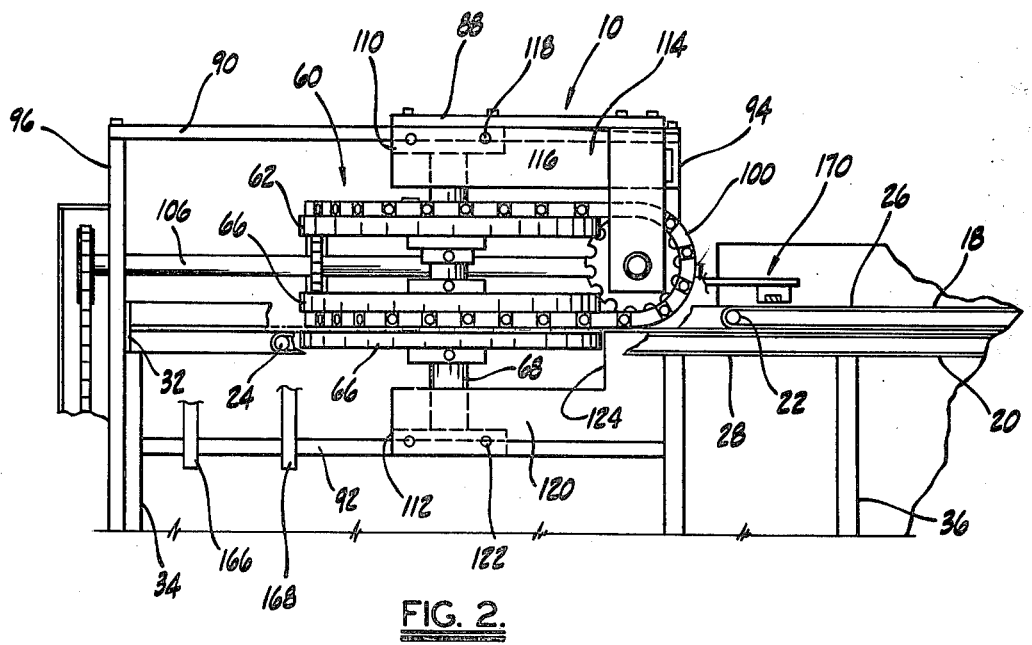
FIG. 2 is a side elevational view of the apparatus.
Figure 4:
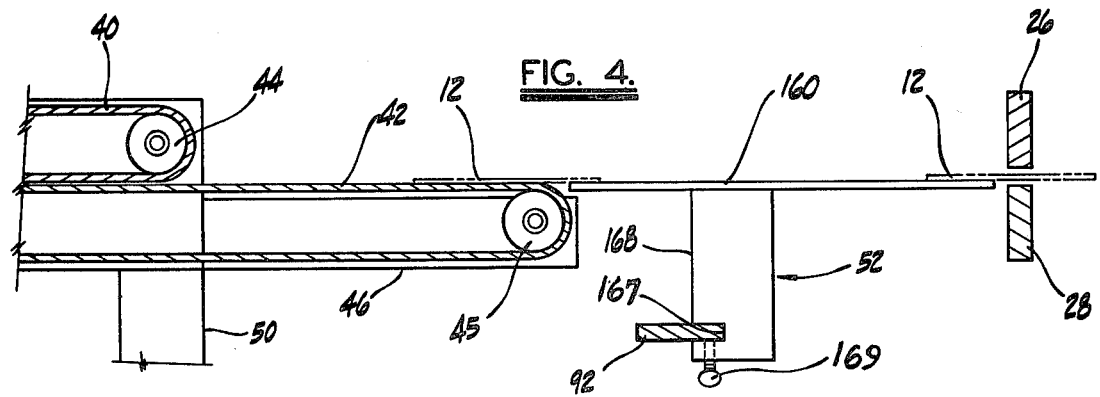
FIG. 4 is an enlarged cross sectional view taken of the guide table taken on line 4—4 of FIG. 1.

The supply conveyor 14 includes upper and lower belts 18 and 20 best shown in FIG. 2 carried by end rollers 22 and 24 respectively supported between inside upper and lower longitudinal support members 26 and 28 and outside longitudinal support member 30, said support members being carried in turn by end support member 32 carried by frame members such as those indicated by numerals 34 and 36. The lower conveyor 20 extends beyond the upper conveyor 18 and terminates adjacent a table portion 38 extending between the longitudinal support members 28 and 30. The follower conveyor 16 receives envelopes passing from the turn conveyor 10 and is substantially similar to the supply conveyor 14 in that it includes, as shown in FIGS. 1 and 4, upper and lower conveyor belts 40 and 42 disposed about end rollers 44 and 45 which extend between inside and outside support members 46 and 48 respectively and are carried by frame support such as that indicated by numeral 50. An adjustable table guide assembly generally indicated by numeral 52 provides a support for the envelopes during their arcuate movement around the turn conveyor 10, and said turn conveyor will now be described.

Figure 3:
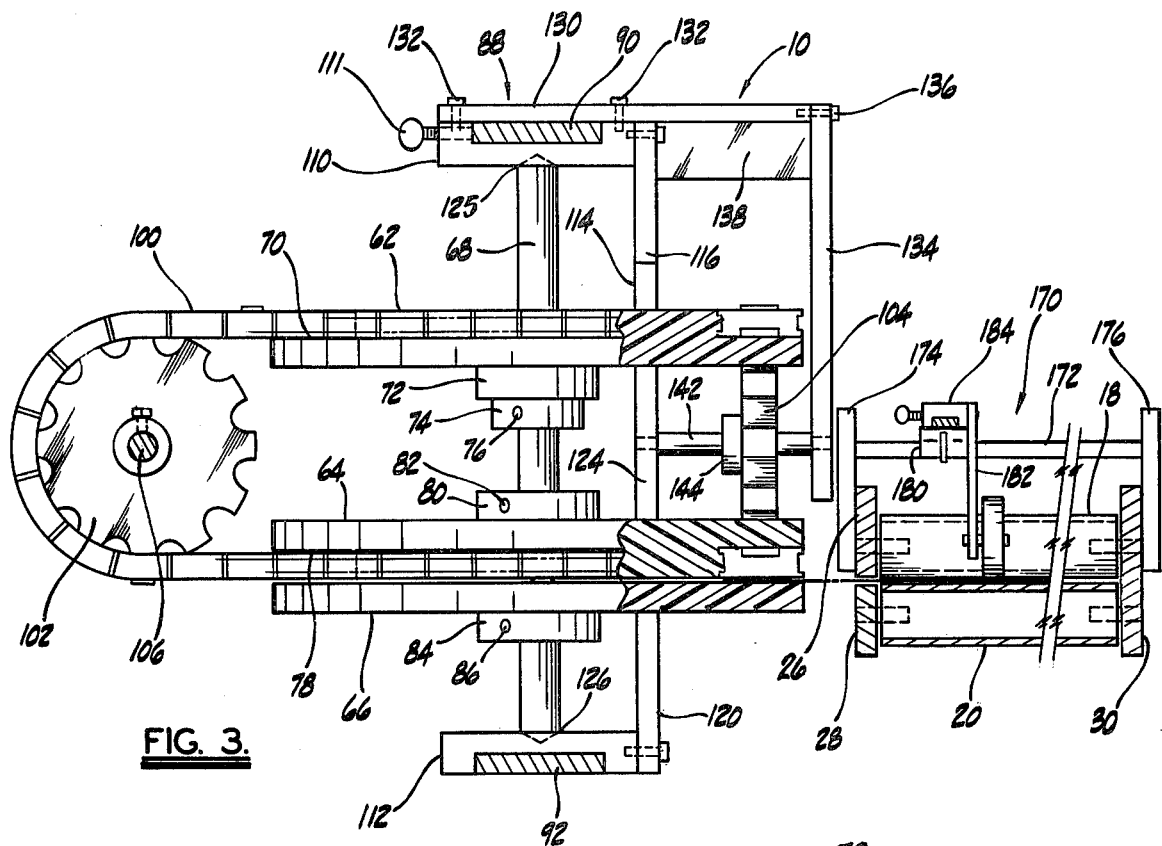
FIG. 3 is an enlarged cross sectional view of the disc assembly taken on line 3—3 of FIG. 1.

Essentially, as shown in FIGS. 1 and 3 the turn conveyor 10 comprises a disc assembly 60 which includes an upper guide disc 62, a lower guide disc 64 and a base guide disc 66 which are mounted to a vertical shaft 68. The upper disc 62, which includes an annular ledge 70 and a boss 72, is freely mounted for rotation relative to the shaft 68 and is seated on a collar 74 which is fixedly attached to said shaft as by set screw 76. The lower disc 64 also includes an annular ledge 78 and a boss 80 but is fixedly attached to said shaft as by set screw 82. The base disc 66 is disposed in spaced relation below the lower disc 64 and includes a boss 84 provided with a set screw 86 by which said base disc is movably mounted to the shaft 68. The shaft 68 in the preferred embodiment is essentially an idler shaft and is pivotally mounted between upper and lower portions of a disc assembly carriage assembly generally indicated by numeral 88. The carriage assembly 88 provides part of the support system which includes upper and lower rails 90 and 92 on which the carriage is mounted, said rails extending between inner and outer vertical support plates 94 and 96 respectively, as shown in FIG. 1.

Importantly, the turn conveyor includes an endless belt 100 constituting a flexible element which extends between a drive sprocket 102 and a driven sprocket 104 constituting rotating elements, said belt passing around the upper and lower discs 62 and 64 and said belt being received by associated ledges 70 and 78 in friction drive relation thereby turning the upper guide disc 62 in a counterclockwise direction and the lower guide disc 64 in a clockwise direction. The drive sprocket 102 is fixedly mounted to a drive shaft 106 which is journal mounted between support plates 94 and 96 in parallel relation to rails 90, 92 and is driven by a drive assembly generally indicated by numeral 108 and mounted to the outside support plate 96. Idler sprocket 104 is journal mounted to the carriage 88 which will now be described with particular reference to FIGS. 2 and 3.

The movable carriage 88 includes an upper saddle 110 which is slidably mounted to the upper rail 90 having a thumb-screw 111 by which the carriage 88 may be selectively fixed in position; a lower saddle 112 which is slidably mounted on the lower rail 92 and a connection plate 114, which is generally U-shaped, see FIG. 2, to provide clearance for the disc assembly 60. The plate 114 includes an upper arm 116 fixedly attached to saddle 110 as by fasteners 118, a lower arm 120 fixedly attached to saddle 112 as by fasteners 122, and a vertical bight portion 124 extending between said arms. The disc assembly shaft 68 is pivotally mounted between said saddles 110 and 112 as by needle mountings at the upper and lower ends 125 and 126 respectively as shown in FIG. 3. An upper plate 130 is connected to the upper saddle 110 as by fasteners 132 and projects outwardly of said plate 114. An outer vertical plate 134 is attached to said upper plate 130 and is connected in depending relation to said upper plate 130 by fasteners 136. The plates 114 and 134 are rigidly connected by means of a strut 138 connected therebetween, said strut providing a rigid disposition between said vertical plates 114 and 134 whereby said plates provide a journal bearing for the idler sprocket shaft 142.

Figure 6:
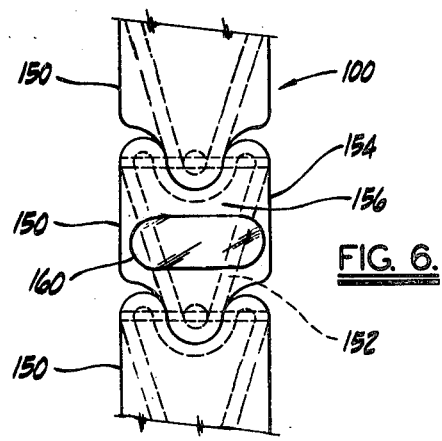
FIG. 6 is an enlarged plan view detail of the link belt.
Figure 5:
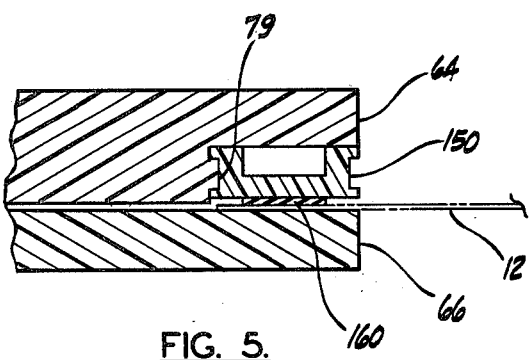
FIG. 5 is an enlarged cross-sectional view detail of the link belt, guide disc and base disc showing a resilient pad.

The flexible element 100, which is shown in enlarged detail in FIGS. 5 and 6, includes a plurality of universally connected links 150 which include upper plate portions 152 and side portions 154 defining a socket portion 156 receiving the teeth of the sprockets 102 and 104. Importantly, a plurality of pads 160 of resilient material such as rubber are fixedly attached, as by adhesive along the length of the flexible element 100. These pads 160 are spaced at particular intervals to receive envelopes 12 and, by way of example, in a flexible element having thirty-six links, one pad is provided every ninth link. As clearly shown in FIG. 6 the links 150, exemplified by the type known commercially as Multiflex, are configured to suit a guide shoulder 79 which is provided on both the upper and lower guide discs. As clearly shown in FIG. 5, the spacing of the base disc 66 and the lower disc 64 is such that the pads 160 tend to grip the envelopes 12 between the outer surface of said pad and the subjacent upper surface of said base disc and turn the envelopes through an arcuate path following the circumferential movement of the disc assembly.

The adjustable table guide assembly 52 which is disposed adjacent the disc assembly 60 and assists in supporting the envelopes 12 during their arcuate movement is best shown by reference to FIGS. 1 and 4. The guide assembly 52 includes inner and outer table plates 162 and 164 supported respectively on vertical supports 166 and 168 each of which is attached to its associated plate as by welding. As shown in FIG. 4 the support plates are notched at 167 and are received by the lower rail 92 in sliding relation, a thumb screw 169 being provided to selectively position the associated table plate relative to the position of the disc assembly as determined by the location of the sliding carriage 88.

In order to provide a smooth transition from between the upper and lower conveyor belts 18 and 26 into the disc assembly 88 a pressure roller assembly 170 is provided, as shown in FIGS. 1 and 3, which is mounted above said conveyors on a transverse rail 172 which extends between side plates 174 and 176 attached to longitudinal side support members 26 and 30. In the embodiment shown, the roller assembly 170 includes a pair of outwardly extending elongate support arms 178 having associated clamps 180 adjustably mounted to the rail 172. Support arms 178 each include a pivoted roller arm 182 attached to said support arm 178 in adjustable relation by means of clamps 184 and bearing on the upper span of conveyor belt 20 or the envelope carried thereby. By this arrangement the roller arms 182 can be adjusted longitudinally and transversely to suit a particular size of envelope and the corresponding disposition of the movable carriage 88 of the turn conveyor 10.

It is thought that the structural features and functional advantages of this turn conveyor 10 have become fully apparent from the foregoing description of parts, but for completeness of disclosure the operation of the device will be briefly described.

It will be assumed that envelopes of the size indicated by numeral 12 are required to pass from the supply conveyor 14 to the follower conveyor 16 and from there to pass to processing stations, for example an envelope gumming station and an envelope drying station (not shown). As clearly shown in FIG. 1 the lower conveyor belts 20 and 42 are disposed adjacent the straight portions of the endless belt 100 extending between points of tangency of the base disc 66 and the sprockets 104 and 102 respectively. It will be assumed that the outer portion of the envelope 12 is to be maintained in alignment for the purpose of downstation processing and that therefore this edge alignment should be constant relative to the follower conveyor 16 regardless of the size of the envelope. Thus, when a larger envelope, indicated by numeral 12, is to be processed, it is intended that the outer edge, when delivered to the follower conveyor 16, be aligned with the same position which would have been assumed by the outer edge of the smaller envelope 12.

The drive mechanism 108 is activated to rotate the drive sprocket and hence move the flexible element 100 along a continuous path defined in part by the diameter of the ledge portions of the upper disc 62 and the lower disc 64. The flexible element pads, four in number in the embodiment shown, pass continuously around the drive sprocket 102, the upper disc 62, the idler sprocket 104 and the lower disc 64. The pads 160 are on the outer face of the flexible element and therefore are oppositely disposed of the upper surface of the base disc 66 on the lower span of the flexible element 100.

The envelopes are passed at specific spacings from the upper and lower conveyor belts 18 and 20 to be delivered by the lower conveyor belt 20 into position under the lower span of the endless flexible element 100. The delivery of the envelopes 12 into this position is facilitated by the adjustable roller assembly 170 disposed longitudinally adjacent of the upper conveyor belt 18 which ensures that the envelopes are maintained in a flat condition immediately prior to being received under the flexible element 100.

The delivery of envelopes from the conveyor belts 18 and 20 is synchronized to coincide with the traveling speed and spacing of the pads 160 on the flexible elements 150 and the envelopes are carried into engagement with the upper surface of the base disc 66 which is spaced from the flexible element 100 a sufficient distance to ensure that the envelopes will be securely held and transported by the disc assembly 60 onto the follower conveyor 16. It will be understood that the envelopes 12 are received between the upper and lower longitudinal support members 26 and 28 and that during transportation around the disc assembly 60 the envelope is supported by the guide table assembly 52.

When it is desired to adjust the turn conveyor to suit a different size envelope, it is simply a matter of adjusting the position of the carriage 88 by loosening the thumb screw 111 of the upper saddle 102 and sliding the carriage assembly rearwardly the required amount, as shown for example in phantom outline. The position of the drive sprocket 102 on the shaft 106 is likewise adjusted by means of set screw 107 moved in the same direction as the carriage 88 so that the flexible element 100 is disposed in the position shown in phantom outline in FIG. 1. The position of the guide table assembly 52 is similarly adjusted by means of the thumb screws 169. The roller arm assembly is also adjusted to suit the rearward displacement of the carriage 88. Initially, the larger envelopes 12' have their inner edge in the same position as the smaller envelopes 12, with the result that the outer edge is disposed outwardly of that of said smaller envelopes when delivered under the flexible element 100. This position is maintained until the envelopes reach the point of tangency of the disc assembly 60 and the flexible element 100 which they do earlier than is the case with the smaller envelopes because of the adjusted position of the disc assembly 60. When the right-angle curve is completed the outer edges of the envelopes 12' are aligned in the same position as were the outer edges of the envelopes 12.

I claim as my invention:

1. A turn conveyor for carrying a flat article from a first conveyor to a second, angularly related conveyor said turn conveyor including:
   (a) support means,
   (b) a first rotatable element mounted to said support means and rotating about an axis generally perpendicular to the direction of conveyance of said first conveyor,
   (c) a second rotatable element mounted to said support means and rotating about an axis generally perpendicular to the direction of conveyance of said second conveyor,
   (d) an endless flexible element disposed about said first and second rotatable elements including friction means disposed on the outer face thereof,
   (e) drive means moving said flexible element about said first and second rotatable elements, and
   (f) a corner disc assembly mounted to said support means between said first and second elements and rotatable about an axis transversely related to said first and second axes, said disc assembly including:
      (1) shaft means
      (2) an upper guide disc receiving the upper span of said flexible element,
      (3) a lower guide disc receiving the lower span of said flexible element, and
      (4) a base disc disposed below said lower guide disc and having an annular surface disposed adjacent the flexible element and cooperating with said friction means to carry said flat articles in an arcuate path between said angularly related conveyors.

2. A turn conveyor as defined in claim 1, in which:
   (g) the friction means includes a plurality of resilient pads attached to said flexible element in selectively spaced relation.

3. A turn conveyor as defined in claim 1, in which:
   (g) said support means includes rail means and carriage means movably mounted to said rail means in adjustable relation, and
   (h) said disc assembly is mounted to said carriage means for movement therewith.

4. A turn conveyor as defined in claim 1, in which:
   (g) said support means includes upper and lower rail means and carriage means, said carriage means having upper and lower portions movably mounted to associated rail means and having means interconnecting said upper and lower portions.

5. A turn conveyor as defined in claim 4, in which:
   (h) said disc assembly shaft means is mounted between said upper and lower carriage portions, and
   (i) said carriage means includes shaft means and one of said rotatable elements is mounted to said shaft means.

6. A turn conveyor as defined in claim 5, in which:
   (j) said support means includes shaft means disposed in spaced parallel relation to said rail means and the other of said rotatable elements is mounted to said shaft means in movable relation, and
   (k) one of the shaft means mounting said rotatable elements is connected to said drive means in drive relation.

7. A turn conveyor as defined in claim 1, in which:
   (g) the support means includes upper and lower portions disposed in spaced relation to each other,
   (h) said disc assembly shaft means is rotatably mounted between said upper and lower portions,
   (i) one of said guide discs is fixedly mounted to said shaft means for movement therewith and the other of said guide discs is freely mounted to said shaft means for movement in the opposite direction thereto, and
   (j) said base disc is mounted to said shaft means for movement with said lower guide disc.

8. A turn conveyor as defined in claim 7, in which:
   (k) said base disc is mounted to said shaft means in longitudinally adjustable relation to selectively space said base disc from the outer surface of said endless flexible element to suit the thickness of the flat article.

9. A turn conveyor as defined in claim 1, in which:
(g) said endless flexible element includes a plurality of link elements connected together for movement in at least two directions, and
(h) said friction means includes a plurality of individual resilient pads attached to selected links at substantially equally spaced intervals about said flexible element.

10. A turn conveyor as defined in claim 1, in which:
(g) the support means includes table guide means disposed in adjacent relation to said base disc to support the outer portions of said flat articles during arcuate motion with said base disc.

11. A turn conveyor as defined in claim 1, in which:
(g) said support means includes rail means and carriage means movably mounted to said rail means in adjustable relation, and
(h) said support means also includes table guide means disposed in outwardly adjacent relation to said base disc and movably mounted to said rail means in adjustable relation said table guide means to support the outer portions of said flat articles during arcuate motion with said base disc.

12. A turn conveyor as defined in claim 1, in which:
(g) said support means includes rail means and carriage means mounted to said rail means for selective horizontal movement in a direction generally parallel with the direction of travel of said first conveyor and transversely of said second conveyor,
(h) the axis of rotation of said first rotatable element is perpendicular to the axis of rotation of said second rotatable element, and
(i) said disc assembly is mounted to said carriage means for rotation about a vertical axis for movement with said carriage means parallel to the direction of travel of said first conveyor and toward or away from the second conveyor.

13. A turn conveyor as defined in claim 12, in which:
(j) said flexible element includes upper and lower straight portions extending from the point of tangency of said rotatable elements to the point of tangency of said upper and lower guide discs, and
(k) said straight portions are disposed in overlapping relation to said associated first and second conveyors.

14. A turn conveyor as defined in claim 13, in which:
(l) roller arm means is mounted to the support means in adjustable relation to the first rotatable element to apply pressure to the flat article prior to engagement with the flexible element lower straight portion.

15. A turn conveyor for carrying a flat article from a first conveyor to a second, angularly related conveyor, said turn conveyor including:
(a) support means,
(b) a first rotatable element mounted to said support means and rotating about an axis transverse to the direction of conveyance of said first conveyor,
(c) a second rotatable element mounted to said support means and rotating about an axis transverse to the direction of conveyance of said second conveyor,
(d) an endless flexible element disposed about said first and second rotatable elements including friction means disposed outwardly of the outer face thereof,
(e) drive means moving said flexible element about said first and second rotatable elements, and
(f) a corner disc assembly mounted to said support means between said first and second elements and rotatable about an axis transversely related to said first and second axes, said disc assembly including:
(1) shaft means,
(2) an upper guide disc receiving the upper span of said flexible element,
(3) a lower guide disc receiving the lower span of said flexible element, and
(4) a base disc disposed below said lower guide disc and having an annular surface disposed adjacent the flexible element and cooperating with said friction means to carry said flat articles in an arcuate path between said angularly related conveyors.

* * * * *